United States Patent [19]

Hurvig et al.

[11] Patent Number: 5,745,752
[45] Date of Patent: Apr. 28, 1998

[54] DUAL NAMESPACE CLIENT HAVING LONG AND SHORT FILENAMES

[75] Inventors: Hans Hurvig, Kirkland; Thomas R. Reardon, Seattle, both of Wash.

[73] Assignee: Microsoft Corporation, Redmond, Wash.

[21] Appl. No.: 354,625

[22] Filed: Dec. 13, 1994

[51] Int. Cl.⁶ .................................................. G06F 17/30
[52] U.S. Cl. ............................ 395/616; 395/610; 395/601
[58] Field of Search ............................ 395/600, 375, 395/410, 420, 934, 612, 616, 601, 610

[56] References Cited

U.S. PATENT DOCUMENTS

| 5,388,257 | 2/1995 | Bauer | 395/601 |
| 5,412,808 | 5/1995 | Bauer | 395/601 |
| 5,434,974 | 7/1995 | Loucks et al. | 395/612 |
| 5,437,029 | 7/1995 | Sinha | 395/616 |
| 5,483,652 | 1/1996 | Sudama et al. | 395/610 |
| 5,579,517 | 11/1996 | Reynolds et al. | 395/616 |
| 5,617,568 | 4/1997 | Ault et al. | 395/612 |

*Primary Examiner*—Thomas G. Black
*Assistant Examiner*—Greta L. Robinson
*Attorney, Agent, or Firm*—Leydig, Voit & Mayer, Ltd.

[57] ABSTRACT

A method and system for providing a dual namespace client is disclosed. The present invention provides support and compatibility to a filesystem of a client which may have multiple local namespaces. In an embodiment of the present invention where the client is a node supported by a network server, the client, by communicating with and querying the network server, is able to direct the server to follow the client's rules governing appropriate filesystem operations. The integrity of the names of the files or entries stored on the network server are maintained without requiring any modifications to the structure or operation of the server itself.

12 Claims, 6 Drawing Sheets

DUAL NAMESPACE CLIENT HAVING LONG AND SHORT FILENAMES

FIELD OF THE INVENTION

The present invention relates generally to filesystems, and more particularly to a method of maintaining a filesystem having multiple namespaces which contain multiple names for files.

BACKGROUND OF THE INVENTION

A computer filesystem can generally be thought of as an organized collection of entries. Each entry in the filesystem can either be a file or a directory. A directory itself can contain additional entries whereas a file cannot. A special directory, commonly called the root directory, contains all the entries of the filesystem in a nested tree-like manner. Thus, every entry in a filesystem with the exception of the root itself is contained in a directory.

When an entry is created, it is usually given a name in a specific namespace that is unique among the names of other entries contained within the same directory. Thereafter, filesystems with multiple namespaces typically generate corresponding names of the entry for each additional namespace maintained by the filesystem. An attempt is made by the filesystem to generate names which are as similar as possible to the original name of the entry. Again, each corresponding name which is generated in the multiple namespaces is unique from the names in the corresponding namespace of other entries contained within the same directory.

A path to an entry is a sequence of names which identifies an entry. If the path is a sequence of names starting from the root directory, then the path can be considered an absolute path. Otherwise, the path is considered to be relative to some other entry. The last component of a path can be referred to as the tailname of the entry while the directory which contains the entry is referred to as the base entry for the entry.

Problems may arise in maintaining the integrity of filesystems with multiple namespaces. Unique names in multiple namespaces, each having their own syntax requirements, must be maintained as well as any rules the filesystem has relating to the interaction between the multiple names of entries in the various namespaces. This problem is typically compounded in a networking environment.

For example, in a typical network system, groups of devices, such as computers, printers and other computer peripherals are communicatively coupled together to provide resource sharing and/or data sharing. Resources and data are shared by allowing these network devices, referred to as nodes, to communicate with other nodes on the network and to request or offer data and services from or to other nodes. Network servers are common network nodes which allow other nodes, such as network clients, to access files stored on the network servers.

For maximum versatility, it is desirable for the network servers to allow many different types of network clients to access the server's files. However, each different type of network client commonly has its own syntax rules governing the manner in which files are accessed and identified. For example, a client running in the Microsoft® MS-DOS® operating system environment has syntax rule limiting the maximum number of characters which can be used to identify an entry to 11 (known as the 8.3 format), whereas a client, for example, running in the IBM® OS/2™ operating system is not so limited.

As a result, network servers which allow multiple types of network clients to access the same files must accommodate the file syntax rules of the various clients. Accordingly, for each commonly accessible file maintained at the network, the network server creates and maintains a name mapping table containing a separate filename for each of the distinct syntax requirements of the various clients. The collection of filenames at the server associated with one specific client type is often referred to as the namespace of that client.

When a file is saved by a client using its particular namespace, the server updates a name mapping table it maintains and, as described above, creates additional syntactically correct names of the saved file in the other namespaces as well. For example, if an IBM® OS/2™ client saved a file named "very_long_file.name" on the server, the server would create a unique MS-DOS® name for the file such as "very_lon.nam" so that other MS-DOS® clients connected to the server would be able to access the "very_long_file.name" file created by the IBM® OS/2™ client. Similarly, the server would create other unique names for the file in any other existing namespaces (such as Apple™, Unix™, etc. . . . ) and store the unique names in the name mapping table. This process is called "mapping." If, for example, the MS-DOS® name "very_lon.nam" already existed on the server, then the mapping process would pick a different name for the MS-DOS® namespace, e.g. "very_lon.na2." If the name of an entry is subsequently changed after being created, then the mapping process typically would be performed anew and each of the namespaces would be updated.

The above scheme for maintaining network namespaces, while generally workable, has certain drawbacks and deficiencies. Specifically, existing network servers typically expect only one namespace per client and thus provide support for operations directed to one namespace at a time. As a result, such network servers cannot fully serve clients running an operating system which supports multiple names of files, such as Microsoft® Windows™ 95.

This problem is compounded by the fact that existing network servers typically will be unaware of any interrelationships between the syntax rules of the multiple namespaces on the network client. As a result, names given entries in the namespaces of the server may not match the names given the entries in the corresponding namespaces of the client's local filesystem. Filename integrity may be compromised or wholesale incompatibility may arise since the client may be unable to access files in the namespaces of the server.

OBJECTS AND SUMMARY OF THE INVENTION

Accordingly, a general object of the present invention is to provide a method of ensuring the integrity of names contained in a multiple namespaces of a computer system without requiring modifications to the computer system's underlying filesystem.

Another general object of the present invention is to perform filesystem operations properly on entries contained in multiple namespaces of computer systems.

An additional object of the present invention is to provide a network client having multiple namespaces which is compatible with existing network servers supporting requests to and from only one namespace at a time.

A further object of the present invention is to provide a multiple namespace network client wherein the client ensures that the server follows the syntax rules governing any interrelationship between the multiple namespaces of the client.

Another object of the present invention is to provide multiple namespace support to a client while maintaining the integrity of the files stored on the network server.

The foregoing and other objects are, in the present invention, embodied in an improved multiple namespace client. In one embodiment of the present invention, the method of providing multiple namespace support to a network client is generally accomplished by intercepting file operations at the client that are destined for the network server and, depending upon the file operation, querying the network server to ensure that the file operations can be performed by the network server consistently with the file management requirements of the multiple namespaces of the client, and if so, having the client further direct the server to perform the requested file operation.

An advantage to the present invention is that filename integrity at the server is achieved since the client knows in advance whether certain operations directed to the network server will achieve the desired and expected results. The network server can, using the present invention, now support multiple namespace clients without necessitating any modifications to the server or its underlying filesystem.

Other objects and advantages will become apparent from the following detailed description when taken in conjunction with attached drawings. While the invention is amenable to various modifications and alternative constructions, a certain illustrated embodiment thereof has been shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention.

DETAILED DESCRIPTION OF THE PREFERRED EMBODIMENT

Figure 1:
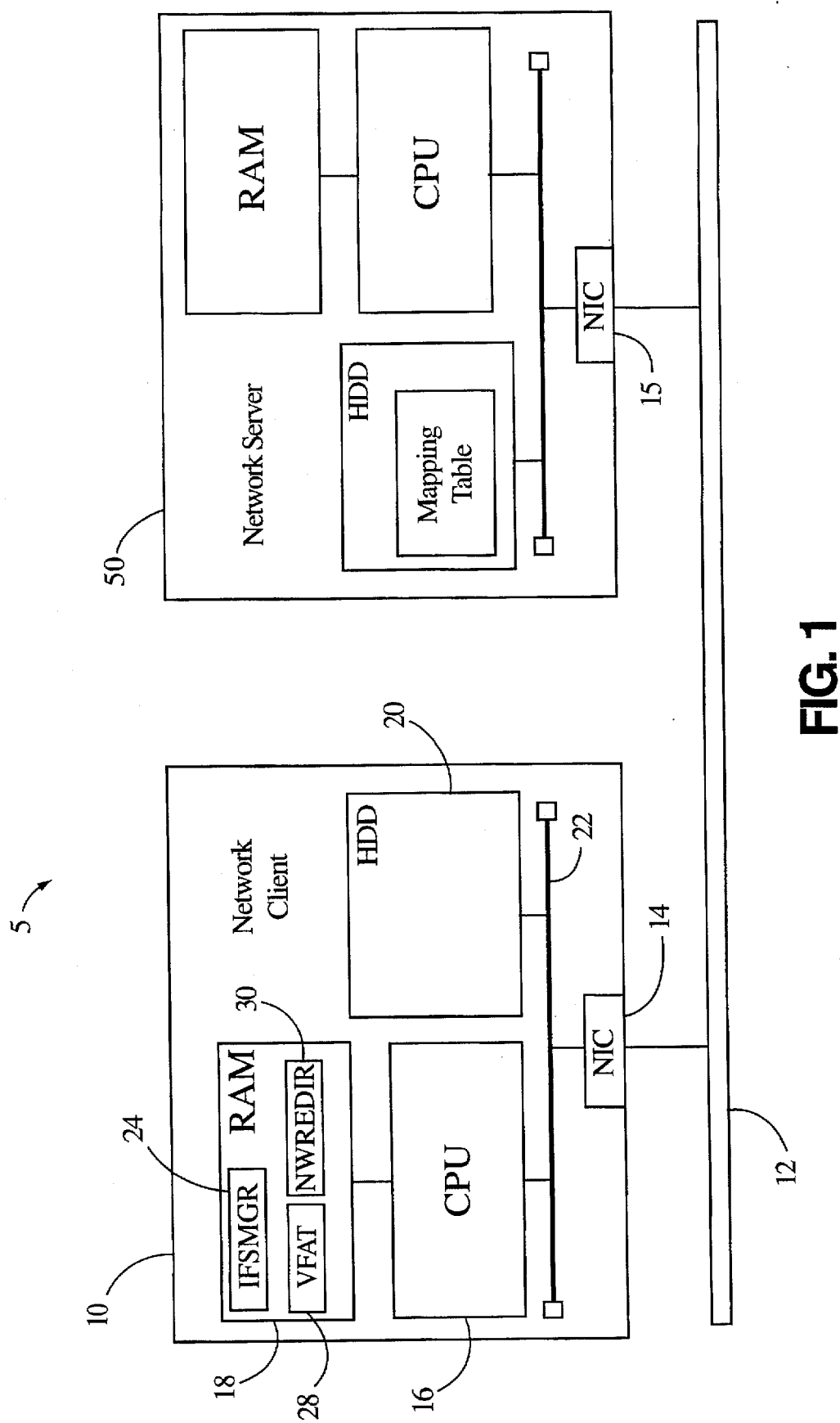
FIG. 1 is a schematic diagram of a preferred embodiment of the present invention in the form of a dual namespace client shown in an intended network environment.

Referring to FIG. 1, there is shown a schematic diagram of a preferred embodiment of the present invention in the form of a dual name space client 10. FIG. 1 shows the client 10 interconnected to a Local Area Network (LAN) system 5.

The client 10 and a network server 50 are attached to the LAN 5 by appropriate cabling 12, which in a preferred embodiment support an Ethernet frame scheme. Network interface cards (NICS) 14, 15 attach the client 10 and server 50 to the network cabling 12 and enables the transmission and reception of data packets between the respective nodes on the network 5.

The client 10 comprises a microprocessor (CPU) 16, a RAM 18 and a hard disk drive (HDD) 20 which communicate via an internal data bus 22. The CPU 16 may be an Intel® 80486 type processor and the client 10 preferably comprises a computer workstation running the Microsoft® Windows™ 95 and MS-DOS® operating systems. Information regarding the details of the Windows™ 95 operating system can be found in a publication by Adrian King entitled "Windows 95," Microsoft® Press, 1994, which is herein incorporated by reference.

The network server 50 comprises another computer workstation running the Novell NetWare® server communication software. In the disclosed preferred embodiment of the present invention, communication between the client 10 and the server 50 is accomplished using the Internetwork Packet Exchange (IPX®) protocol in conjunction with Novell's network core protocol (NCP). NCP is a half-duplex, request/response protocol whereby an originating device typically initiates a communication by providing an NCP request packet to the destination node. The NCP packet occupies the data portion of an IPX® packet. The destination node then processes the request and responds accordingly. The originating device receives and processes the response, and, based thereon, may take some further action, which often includes transmitting another request. While certain elements used in the illustrative embodiment of the present invention are specifically identified herein, many variations and substitutions, known to those skilled in the art, can be employed without deviating from the intended scope of the present invention.

Additional information regarding the NCP protocol can be found in an article by Pawel Szczerbina entitled "Novell's NetWare® Core Protocol," Dr. Dobb's Journal, November, 1993, pp. 123–132, which is herein incorporated by reference. For more information on the IPX® protocol, reference is made to *NetWare The Professional Reference*, by Karanjit Siyan, 2nd ed. (Copyright 1993 by New Riders Publishing), which is hereby incorporated by reference.

Locally, the client 10 supports the naming of files in two distinct namespaces. One name space uses the well known syntax rules of MS-DOS® (8.3 format) and is referred to herein as a short file name (SFN) namespace. The second namespace uses the similarly well known syntax rules of IBM OS/2™ HPFS and is referred to herein as a long file name (LFN) namespace. Thus, every entry (except the root) has two tailnames: 1) a name in the SFN namespace which must be syntactically short, called its restricted name, and 2) a name in the LFN namespace which can be syntactically short or long, called its general name.

Local client operations on files and directories (collectively "entries") can be performed by using either a LFN or SFN path of the entry. In addition, operations on entries locally can be performed by using a path of a mixed variety, e.g. C:\LFN\SFN\LFN. The server 50 maintains the names of its entries in both the SFN and LFN namespaces of the server 50 and can also identify files by unique 4 byte handles and directories by unique 1 byte handles.

To avoid complications related to unique names of entries in both namespaces, the Windows 95 operating system of the client 10 requires that if a path component of an entry in the LFN namespace meets the syntax and length requirements of a SFN, then the path component in the LFN namespace must equal the path component in the SFN namespace for that entry. For convenience, this rule will be referred to as the "Windows 95 rule" and such a path component will be referred to as an "8.3LFN." The local maintenance of LFNs and SFNs by the client 10 may be performed as shown in copending application of Reynolds et al., Ser. No. 08/041,497, filed Apr. 1, 1993, which is hereby incorporated by reference.

As discussed above in the background section, supporting a dual namespace in the above manner creates problems interfacing with the network server 50 which expects a client to access only one namespace. For example, the server 50 does not have the same requirement of the client 10 that the name of an 8.3LFN must be the same in both the LFN and SFN namespaces of the server 50. Accordingly, if the client 10 attempts to perform a filesystem operation, such as saving a file on the server 50 using an 8.3LFN (e.g. "long.fil"), a mechanism must be provided to ensure the identity of the names by rejecting the operation or allowing the operation to proceed, if appropriate.

Normally, the server 50 would map the 8.3LFN to an identical SFN without modification of the name. However, in the above example, if a file previously existed at the server 50 with the SFN name of "long.fil", then the server would have to map the 8.3LFN "long.fil" to a different name, e.g. "long.fi2," in the SFN namespace. In such a circumstance, the Windows 95 rule would not be satisfied. Data integrity may be compromised because later applications running on the client 10 which attempt to access the 8.3LFN file under the name "long.fil" in the SFN namespace of the server 50 would be provided the previously existing file instead.

To solve this problem, in accordance with one aspect of the present invention, the client 10 ensures (using queries to the server 50 and otherwise) that the file operations of the server 50 are performed consistent with the file operation rules of the client 10.

Figure 2:
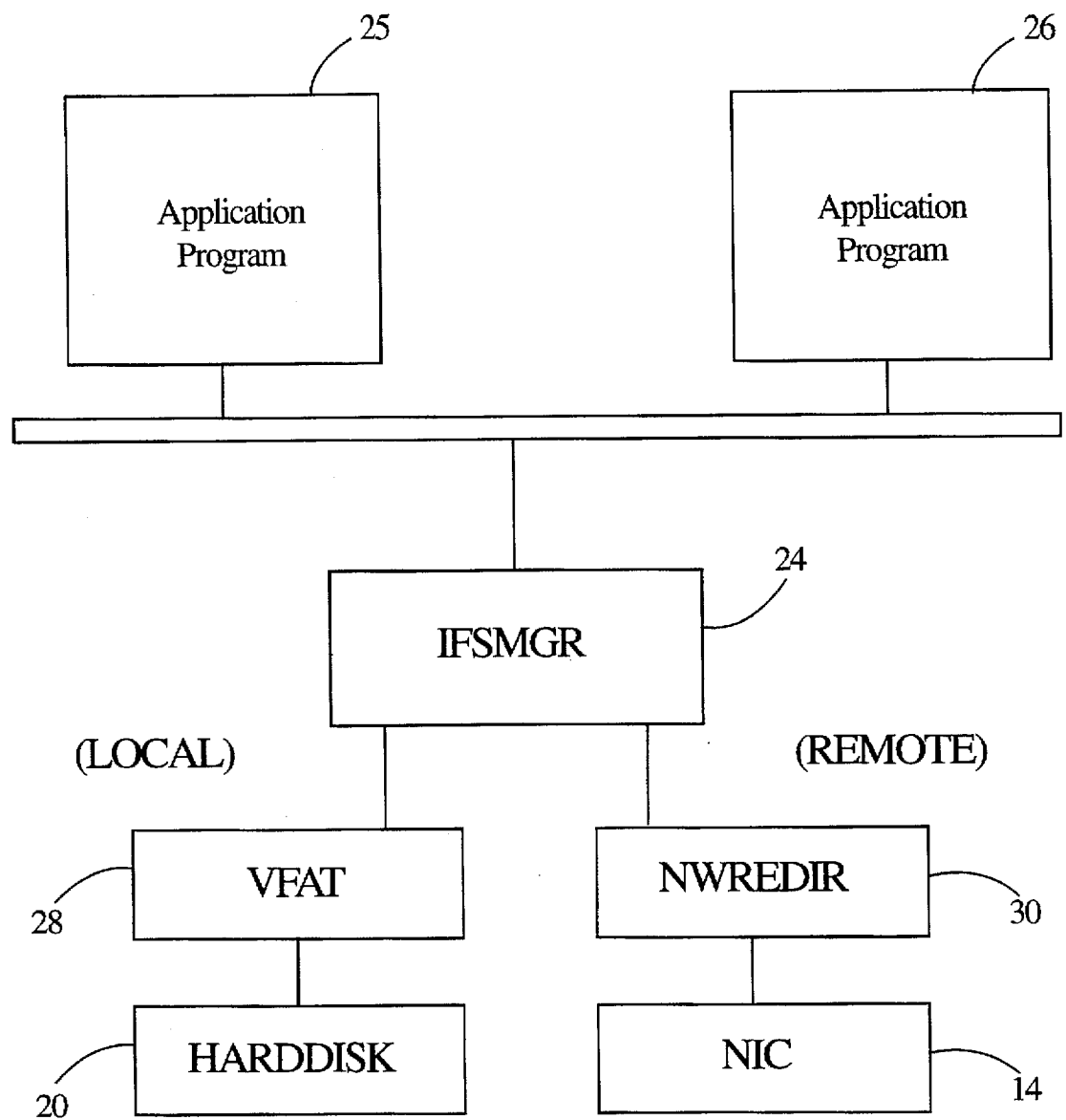
FIG. 2 is a block diagram illustrating the manner in which the embodiment of FIG. 1 routes file or directory operations to either a local service provider or the network.

As shown in FIG. 2, the network client 10 of the present invention includes a router module, called the IFSMGR 24, which provides an interface between requests of applications, such as applications 25 and 26, and the specific filesystem addressed by an application function. The IFSMGR 24 is a virtual device driver (VxD) written in a 32-bit protected mode code which accepts filesystem requests ("calls") from applications and routes the calls to the appropriate filesystem driver. For example, as shown in a simplified manner in FIG. 2, the IFSMGR 24 determines whether a filesystem request is directed to the local harddisk 20 of the client 10 or to the network server 50. Local file requests are routed to the harddisk 20 through the VFAT 28 while network file requests are routed to the network through NWREDIR 30.

Generally, depending upon the file operation, before routing the file operation to the server 50, NWREDIR 30 of the present invention must determine if the Windows 95 rule needs to be enforced at the server 50. If so, NWREDIR 30 queries the server 50 to ensure that no conflicts exist on the server 50. If no conflicts exist, NWREDIR 30 checks the LFN flag provided by IFSMGR 24 to determine whether the file operation is being performed on a LFN or a SFN. If the LFN flag is set, then NWREDIR 30 sends an LFN command operation using the NCP protocol to the server 50. If the LFN flag is not set, then NWREDIR 30 sends a SFN command operation using the NCP protocol to the server 50. However, if NWREDIR 30 determines that a conflict exists with the filenames on the namespaces of the server 50, then the file operation is not performed and the application which attempted the operation is notified. The use of queries ensures that the desired operation is performed correctly, thereby maintaining the filename integrity of entries stored and retrieved from the network.

Figure 3:
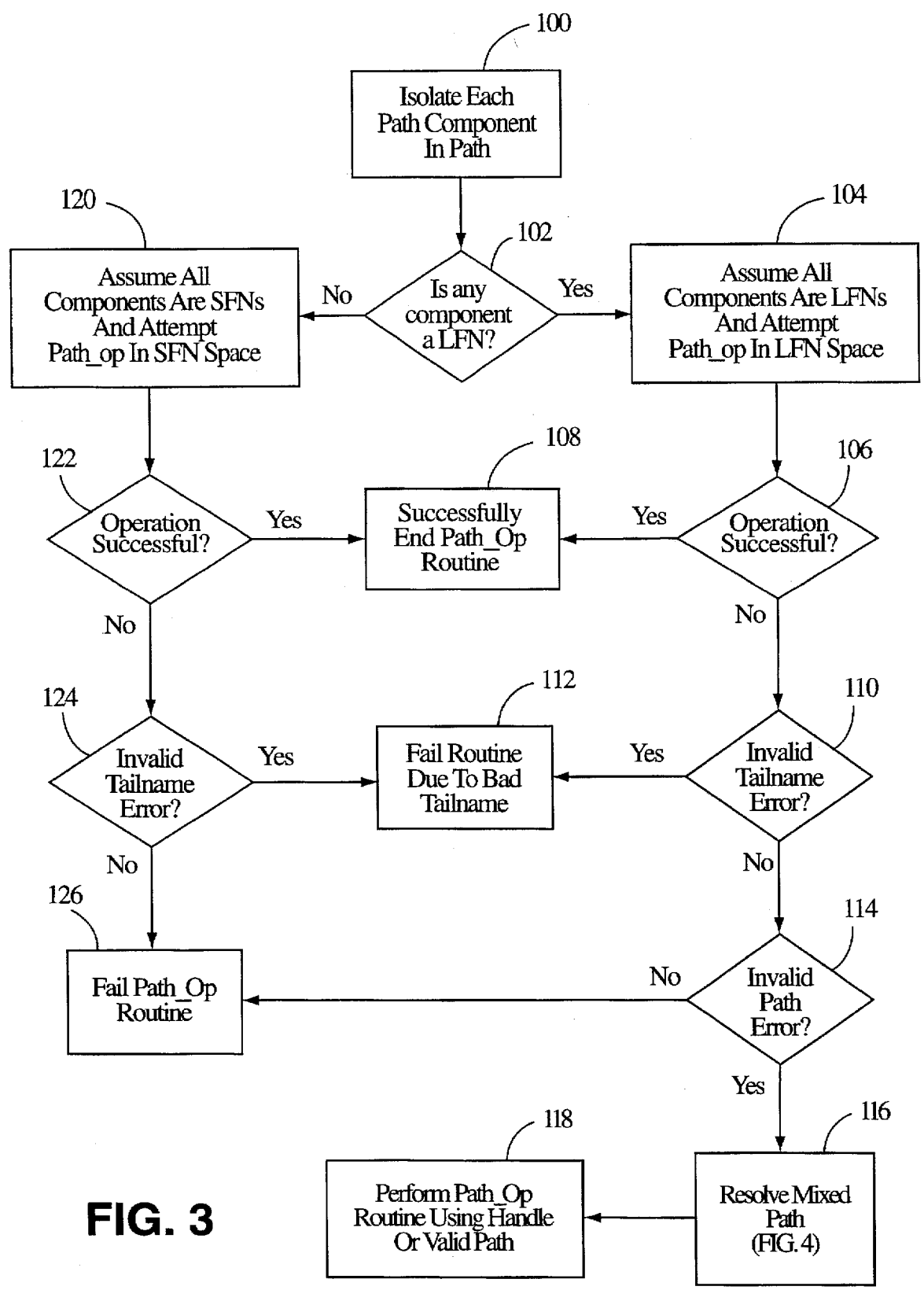
FIG. 3 is a flow diagram illustrating the steps employed by the embodiment of FIG. 1 for path based operations.

FIG. 3 is a flow diagram illustrating the steps performed by the disclosed preferred embodiment of the present invention to implement path based operations. Path based operations are routines which require the path of the entry to perform the particular operation, such as open file, create file, rename file, delete file, set attribute of file, rename directory, and make directory.

At step 100 of FIG. 3, each individual path component in the path is isolated to determine if there are any path components matching the syntax requirements for the LFN namespace (step 102). If so, it is more likely than not that all of the path components are LFNs since paths of a mixed variety are not the norm. Accordingly, at step 104, the NWREDIR 30 using the NCP protocol attempts to perform the path operation in the LFN namespace of the server 50. If the operation is successful (step 106), then NWREDIR 30 successfully ends the path operation routine and notifies the application (step 108).

If the operation is not successful at that point it may be because of an error related to the tailname of the entry, such as access denied or the like. In such a case, the path is good but the tailname of the entry is invalid or inaccessible. Accordingly, the NWREDIR 30 then fails the routine and the application is notified at step 112.

However, if the operation is unsuccessful because of an invalid path (step 114), the initial assumption that all path components were valid in the LFN namespace was incorrect and the path is actually a mixed path. Accordingly, the disclosed embodiment of the present invention then attempts (at step 116) to resolve the mixed path by ascertaining the handle to the entry or by obtaining a valid path for the entry in one of the namespaces of the server 50. The step of resolving the mixed path is further explained in FIG. 4. After resolving the path, the path operation routine is performed, using the handle of the entry or a path that is valid in a single namespace (step 118).

If at step 102 no path components were determined to be syntactically LFNs, then each of the path components should exist in the SFN namespace of the server 50. The path operation therefore should be possible in the SFN namespace of the server 50 and such an attempt is made at step 120. If the operation is not successful (step 122), the path is either in error (step 124) or some other non-name related error has occurred. In either case, the routine is failed at step 112 or step 126 and the application is notified. Enforcing the Windows 95 rule at the server 50 ensures that it is not necessary to attempt to resolve a SFN in the LFN namespace.

Figure 4:
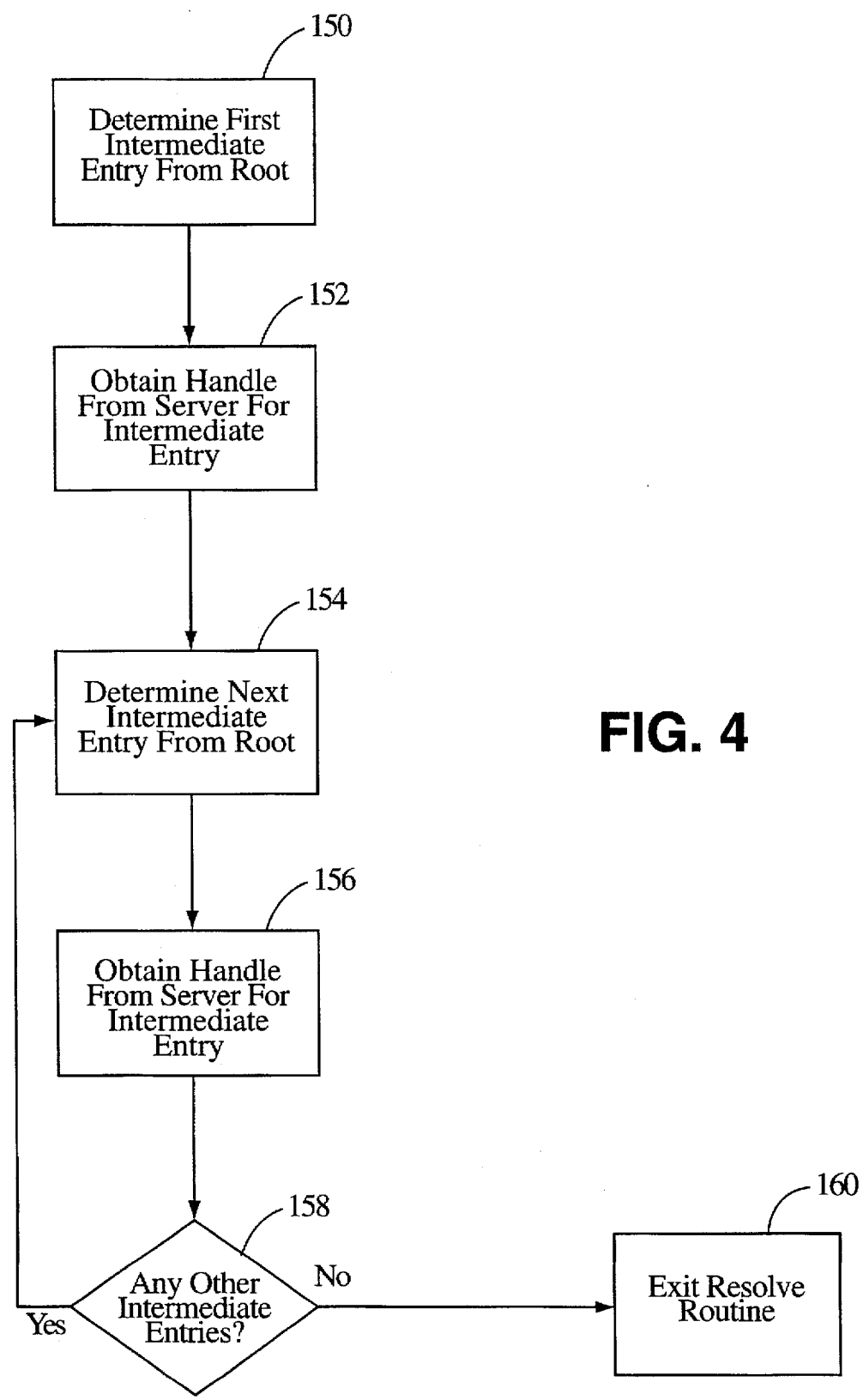
FIG. 4 is a flow diagram illustrating the steps employed by the embodiment of FIG. 1 to resolve a path of mixed long and short path components into a handle to an entry.

FIG. 4 is a flow diagram illustrating the steps employed by the disclosed preferred embodiment to resolve a path of mixed long and short path components into a handle to an entry. For ease of reference, the following discussion will consider the case where the path equals "\LFN1\LFN2\LFN3\SFN1\SFN2\LFN4\LFN5." However, it should be appreciated that the process for resolving such mixed paths is independent of the number and ordering of the various LFN and SFN path components.

As shown in FIG. 4, to resolve a mixed path, the first intermediate entry from the root is determined at step 150. To determine the first intermediate entry, the NWREDIR 30 starts at the root path component and determines whether it is syntactically a SFN or a LFN. In this case, the root path component is a LFN. The first intermediate entry then is reached by the successive path components from the root to the first transition point from a LFN path component to a SFN path component, i.e. "\LFN1\LFN2\LFN3\."

At step 152, the NWREDIR 30 queries the server 50 to obtain the handle to the first intermediate entry. To determine the next intermediate entry, the NWREDIR 30 starts at the transition point and determines whether it is syntactically a SFN or a LFN. In this case, the first component at the transition point is a SFN, namely "SFN1." The next intermediate entry then is reached by successive path components from the transition point to the next transition point, if any, from a SFN path component to a LFN component, or the tailname which is the end of the last intermediate entry. In this case, the next intermediate entry is "SFN1\SFN2\," which is a relative path from the first intermediate entry.

At step 156, the NWREDIR 30 queries the server 50 to obtain the handle to the entry defined by this next intermediate entry. Since the next intermediate entry is reached by a relative path, the handle of the previous intermediate entry is used as the base entry.

As shown at step 158, if there are any more intermediate entries the process is repeated to determine the next intermediate entry at step 154. In this case, the last intermediate entry is "LFN4\LFN5" which is a relative path from the previous intermediate entry. At step 156, the NWREDIR 30 queries the server 50 to obtain the handle to this next (and in this case, last) intermediate entry. As before, since the next intermediate entry is reached by a relative path, the handle of the previous intermediate entry is used as the base entry.

When it is determined that there are no other intermediate entries at step 158, the resolve routine is exited. The handle of the last intermediate entry is also the handle for the mixed path, and thus, the mixed path is resolved.

It should be noted that the actual handle to the intermediate entries need not be obtained. Instead, a path to the intermediate entry may be obtained and used to obtain the paths or handles for subsequent intermediate entries, thereby resolving the mixed path to a valid path in a single namespace or the handle to the entry.

Figure 5:
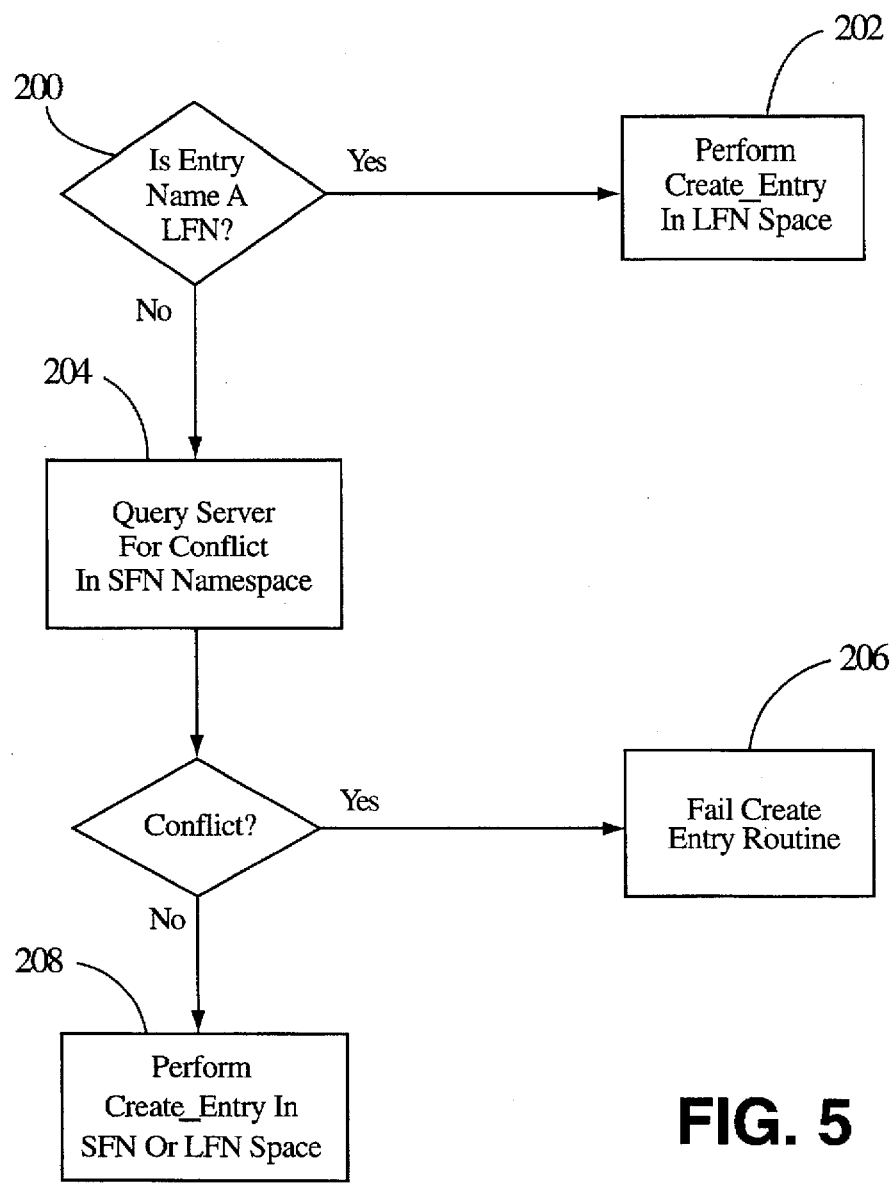
FIG. 5 is a flow diagram illustrating the steps employed by the embodiment of FIG. 1 to create an entry while ensuring that the file handling rules of the client are enforced.

Referring to FIG. 5, therein is shown a flow diagram illustrating the steps employed by the network client 10 of the present invention to create an entry while ensuring that the Windows 95 rule is enforced at the server 50. After the base entry has been resolved, the NWREDIR 30 determines if the tailname of the entry matches the syntax of a LFN (step 200), i.e. does not match the syntax of a SFN. If so, the create entry routine is performed in the LFN namespace of the server 50 (step 202). If not, the NWREDIR queries the server 50 at step 204 to make sure there are no conflicts with the tailname in the SFN namespace. If a conflict exists, the routine fails (step 206) and the NWREDIR 30 notifies the application. If no conflict is present, the create entry routine is performed in the SFN or LFN namespace of the server 50 (step 208). An advantage in performing the create entry routine in the LFN namespace is that, in the preferred embodiment described, the LFN namespace preserves the upper and lower case distinction of characters in the SFN.

Figure 6:
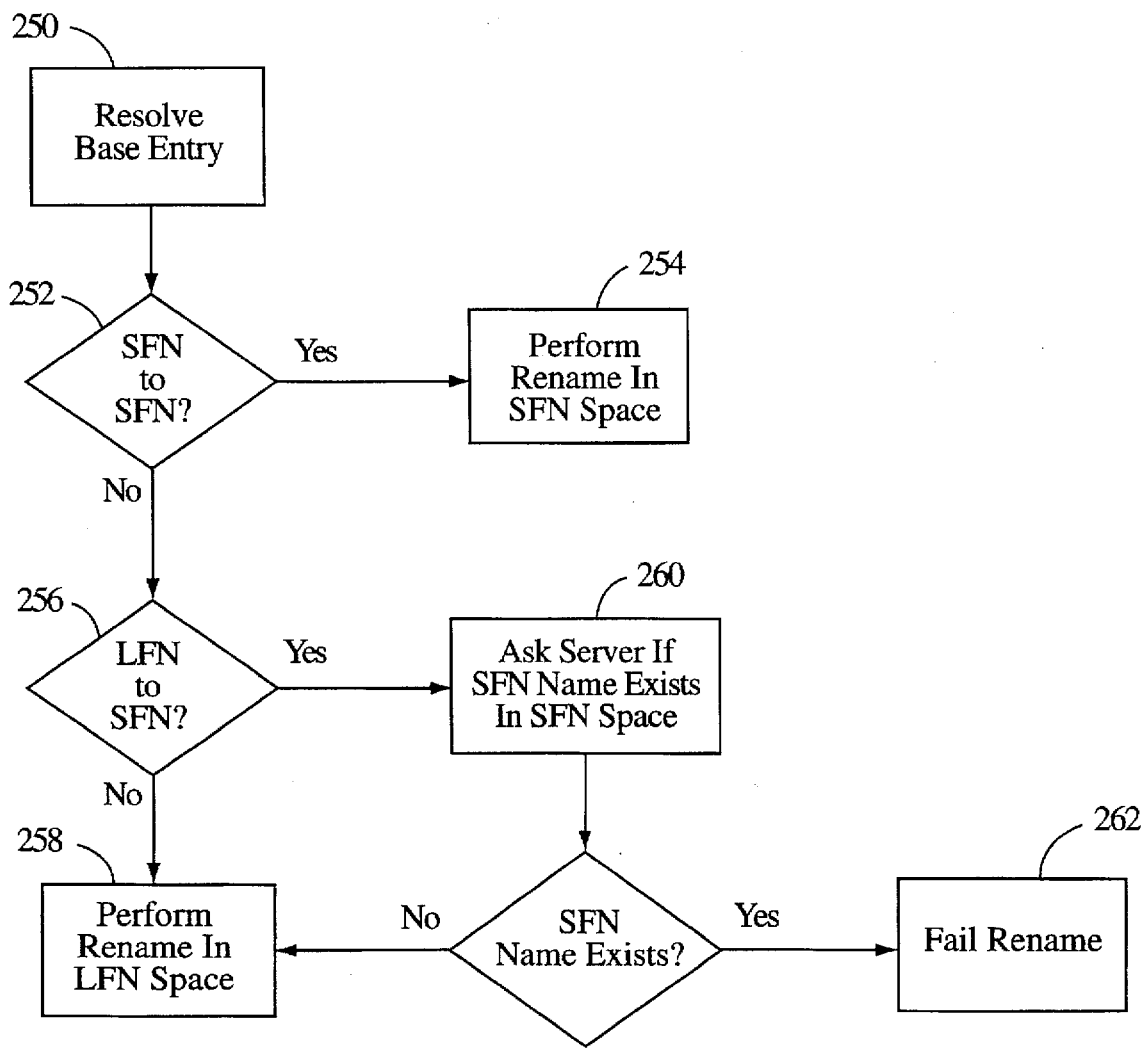
FIG. 6 is a flow diagram illustrating the steps employed by the embodiment of FIG. 1 to rename entries at the server.

FIG. 6 is a flow diagram illustrating the steps employed to rename entries at the server 50. At step 250 the name of the base entry of the entry to be renamed is resolved to obtain its handle. The NWREDIR 30 determines if the rename operation involves renaming a SFN to a SFN (step 252). If so, the rename routine is simply performed in the SFN namespace of the server 50 (step 254). Otherwise, the NWREDIR 30 determines if the rename operation involves renaming a LFN to a SFN (step 256). If not, then the rename operation must involve a SFN to a LFN or a LFN to a LFN. In either case, the rename operation is performed in the LFN namespace (step 258). If the rename operation involves a LFN to SFN, then the NWREDIR 30 queries the server 50 to determine if the SFN is in use in the SFN namespace of the client (step 260). If so, the rename operation is failed at step 262 and the application is notified. If not, the rename routine is performed in the LFN namespace of the server 50 (step 258).

As can be appreciated by those skilled in the art, the foregoing description of the present invention, although shown in a networking environment, is not so limited. For example, the client 10 and server 50 could be interconnected via a direct interface, a modem or other communication link.

Moreover, the present invention is operable on a single computer system. The filesystem of the server 50 may alternatively be a filesysten residing on the client 10 with fixed rules as to the filesystem's interface. For example, if the filesystem of the client 10 does not have the ability to enforce the Windows 95 rule, the present invention would interface with the fixed filesystem to ensure proper maintenance of the namespaces of the fixed filesystem in the same manner as described above.

What is claimed is:

1. In a computer system supporting multiple namespaces containing multiple names for a single entry, a method of resolving a select entry having a path of mixed names, comprising the following steps:

determining each of the intermediate entries reached along the path by locating the transition points from the root where the path components change from the syntax of one namespace that contains a name for each of said intermediate entries to the syntax of another namespace that also contains a name for each of said intermediate entries;

obtaining identifier information for the intermediate entry closest to the root by accessing the namespace associated with the syntax of the intermediate entry name; and obtaining identifier information for any remaining intermediate entries by utilizing the identifier information of the preceding intermediate entries and accessing the namespace associated with the syntax of the intermediate entry name, thereby identifying the select entry.

2. The method of claim 1 whereby the identifier information comprises the handle or valid path for an entry.

3. The method of claim 2 wherein the step of obtaining identifier information comprises obtaining the handle for the select entry.

4. The method of claim 2 wherein the step of obtaining identifier information comprises obtaining a valid path for the select entry in one of the namespaces.

5. The method of claim 1 wherein the computer system comprises a network server and the steps are performed at the direction of a client on a network accessing the server.

6. In a computer system supporting multiple namespaces, a method of implementing a path based filesystem operation on a select entry having a path of mixed names, comprising the following steps:

resolving the select entry to obtain the handle to the entry or a valid path for the select entry in one select namespace of a plurality of associated namespaces, wherein each namespace contains a name for the select entry; and performing the path based filesystem operation on the select entry using the handle or the valid path in the select namespace when the path based filesystem operation does not introduce a new name into the multiple namespaces.

7. The method of claim 6 wherein the computer system comprises a network server and the steps are performed at the direction of a client on a network accessing the server.

8. In a computer system supporting dual namespaces containing both long file names (LFNs) and short file names (SFNs) of entries, each file name being associated with each other and with a single entry, a method of implementing a path based filesystem operation on a select entry having an associated name in both namespaces and having a path of mixed names, comprising the following steps:

first attempting to perform the path based filesystem operation on the select entry using the path of mixed names in a) the LFN namespace when the path of mixed names contains at least one path component which matches the syntax of a LFN but not the syntax of a SFN and b) the SFN namespace when each path component matches the syntax of a SFN;

resolving the select entry to obtain the handle to the entry or a valid path for the select entry in one select namespace of a plurality of associated namespaces, wherein each namespace contains a name for the select entry, when the first attempt to perform the path based filesystem fails; and performing the path based filesystem operation on the select entry using the valid path in the select namespace when the step of resolving the select entry has been performed successfully.

9. The method of claim 8 wherein the computer system comprises a network server and the steps are performed at the direction of a client on a network accessing the server.

10. In a computer network system having at least one client workstation connected for communication with a network server which provides file services to the client, a method of providing multiple namespace support to the client, comprising the following steps:

intercepting a file operation at the client that is destined for the network server;

querying the network server by the client to ensure that said file operation can be performed by the network server consistently with the file management requirements of the multiple namespaces of the client that identify a single file system object; and directing the server by the client to perform the requested file operation.

11. The method of claim 10 further comprising the steps of receiving notification from the server that the file operation has been completed.

12. The method of claim 10 further comprising the steps of receiving notification from the server that an error occurred attempting the file operation.

* * * * *